United States Patent
Essick, IV et al.

(10) Patent No.: US 7,219,209 B2
(45) Date of Patent: May 15, 2007

(54) BUS FILTER FOR MEMORY ADDRESS TRANSLATION

(75) Inventors: Raymond B. Essick, IV, Glen Ellyn, IL (US); Kent D. Moat, Winfield, IL (US)

(73) Assignee: Motorola, Inc., Schaumburg, IL (US)

( * ) Notice: Subject to any disclaimer, the term of this patent is extended or adjusted under 35 U.S.C. 154(b) by 327 days.

(21) Appl. No.: 10/652,137

(22) Filed: Aug. 29, 2003

(65) Prior Publication Data

US 2005/0050297 A1 Mar. 3, 2005

(51) Int. Cl.
*G06F 12/10* (2006.01)

(52) U.S. Cl. ........................ 711/202; 711/207

(58) Field of Classification Search ............... None
See application file for complete search history.

(56) References Cited

U.S. PATENT DOCUMENTS

| 5,937,436 A * | 8/1999 | Watkins ................ 711/202 |
| 6,671,791 B1 * | 12/2003 | McGrath ............... 711/206 |
| 2003/0028751 A1 * | 2/2003 | McDonald et al. ......... 712/34 |

* cited by examiner

*Primary Examiner*—Denise Tran

(57) ABSTRACT

A bus filter includes a first bus interface connected to a system bus for receiving a virtual memory address and a second interface connected to the system bus for transmitting a physical memory address. In operation, an address translation unit, such as a translation lookaside buffer, determines the physical memory address from the virtual memory address. The bus filter may be used to couple a processing device, such as an accelerator, to a system having a core processor and an external memory unit coupled by a bus.

25 Claims, 3 Drawing Sheets

BUS FILTER FOR MEMORY ADDRESS TRANSLATION

FIELD OF THE INVENTION

This invention relates generally to the field of micro-controller memory management. More particularly, this invention relates to a bus filter for translating from virtual memory addresses to physical memory addresses.

BACKGROUND OF THE INVENTION

Digital systems often comprise a number of functional blocks connected by one or more bus structures. An example of a functional block is special purpose accelerator, such as a vector processor or image processor. Functional blocks may be connected using a number of different bus architectures, such as AMBA (Advanced Micro-controller Bus Architecture). AMBA is an open standard, on-chip bus specification that details a strategy for the interconnection and management of functional blocks that make up a System on-Chip (SoC). Special purpose accelerator blocks outside of a processor core often do not have access to the memory address translation functions provided by the processor code, or along the datapath between the code and the main bus. Such devices are usually restricted to "physical addresses" (addresses in a physical memory space), forcing programming model changes to make them useful.

When a system is initialized, large "worst case" contiguous memory regions must be allocated for use by these accelerators. This prevents memory from being allocated at run-time and does not allow non-contiguous memory to be used.

Sun Workstations, circa 1990, used a feature called "DVMA" which allocated some virtual space for device use. However, this feature worked with a restricted address range and its primary intent was to reduce the need for cache flushing in a virtual cache environment.

Special purpose accelerators are used in many applications, including cellular telephones, digital cameras, PDAs and automotive collision avoidance devices.

SUMMARY OF THE INVENTION

The present invention relates generally to micro-controller memory management. Objects and features of the invention will become apparent to those of ordinary skill in the art upon consideration of the following detailed description of the invention.

In one embodiment of the invention, a bus filter translates between virtual and physical memory addresses. The bus filter may be used to couple a processing device, such as an accelerator, to a system having a core processor and an external memory unit coupled by a bus. The bus filter includes a first bus interface connected to the bus for receiving a virtual memory address and a second interface connected to the bus for transmitting a physical memory address. An address translation unit, such as a translation lookaside buffer, determines the physical memory address from the virtual memory address.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION OF THE INVENTION

Figure 1:
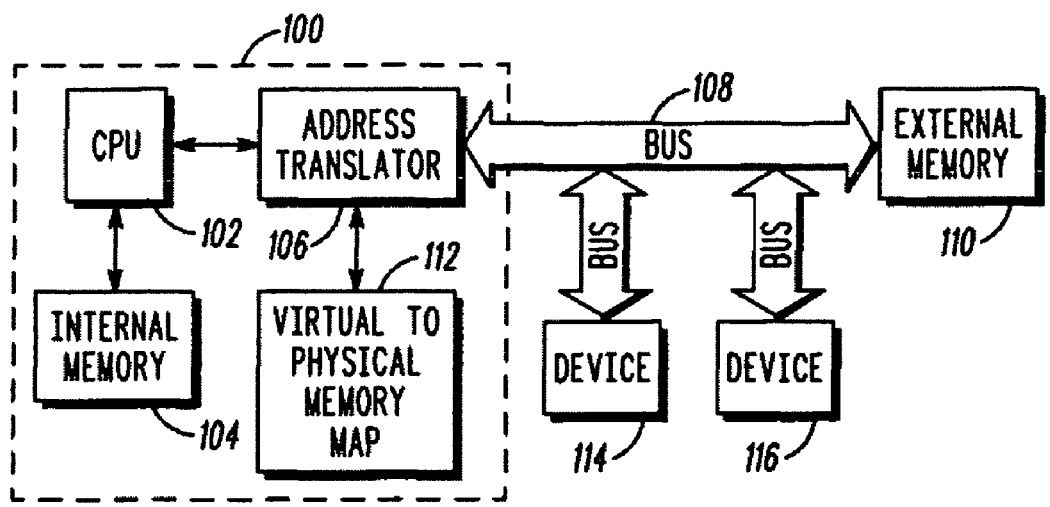
FIG. 1 is a diagrammatic representation of an exemplary system incorporating a bus structure.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

Devices, such as special purpose accelerators, are usually restricted to "physical addresses" (addresses in a physical memory space), forcing programming model changes to make them useful. If such devices operated on "virtual addresses", most of these programming model difficulties would be removed. Such an option would also remove the need to allocate, at initialization time, large "worst case" contiguous memory regions for use by these accelerators. In turn, this would allow systems to be designed with smaller memory footprints.

An exemplary prior art system using a bus structure is shown in FIG. 1. Referring to FIG. 1, a core processor 100 includes a central processing unit (CPU) 102 that interfaces with an internal memory unit 104. In order to permit accesses to external memory, an address translator 106 couples the CPU via a bus structure 108 to an external memory unit 110. The address translator receives virtual (logical) addresses from the CPU and translates them into physical addresses for addressing the external memory 110. The translation may be performed using a virtual-to-physical memory map 112. This map may take the form of a lookup table. Using this system, the CPU can use virtual memory addresses. However, additional devices 114 and 116 that are coupled to the bus structure address the external memory directly and so must use physical addresses. This complicates the programming of the devices.

Figure 2:
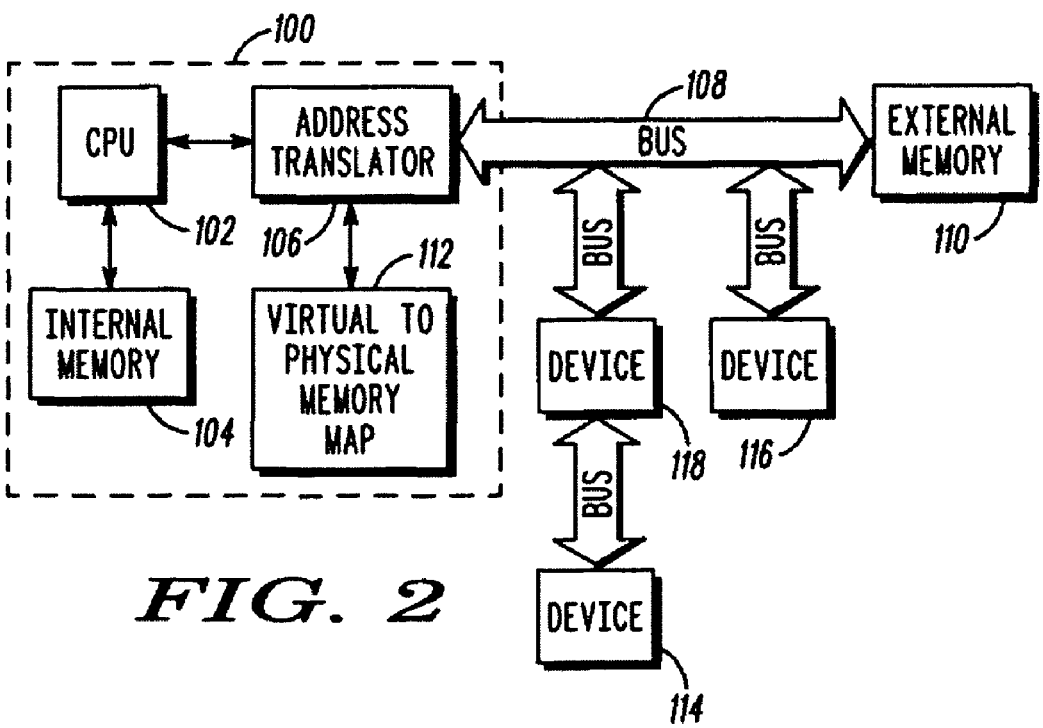
FIG. 2 is a diagrammatic representation of an exemplary system incorporating a bus structure and an address translation filter of the present invention.

An exemplary system incorporating the present invention is shown in FIG. 2. Referring to FIG. 2, an address translation filter 118 of the invention is placed on the bus structure between one of the devices 114 and the external memory 110. The address translation filter has first and second interfaces to allow to be used a filter on a bus structure. The address translation filter passes memory addresses from the attached device 114 through a TLB (translation lookaside buffer), allowing a virtual-to-physical address translation instead of using only physical addresses. This simplifies the programming of the attached device 114. Generally, the buses on either side of the address translation filter are of the same type. Since the buses operate under the same protocol, no protocol translation is required. The address translation filter performs virtual-to-physical address translation. The virtual memory may have a different width to the physical memory.

When the attached device is programmable, code may be transferred from the core processor to the attached device via the bus. The memory map in the address translation filter may be initialized at the same time, thereby reducing the time spent refreshing the map during operation of the code.

The invention may be used with a variety of different bus architectures, but the AMBA will be used as an example. The address translation filter can be inserted between any device that interfaces to an AMBA bus and the AMBA bus. The AMBA bus protocols are robust enough to handle any extra cycles of delay introduced by the filtering device. Such extra cycles appear to the attached device as a slightly slower memory system.

Figure 3:
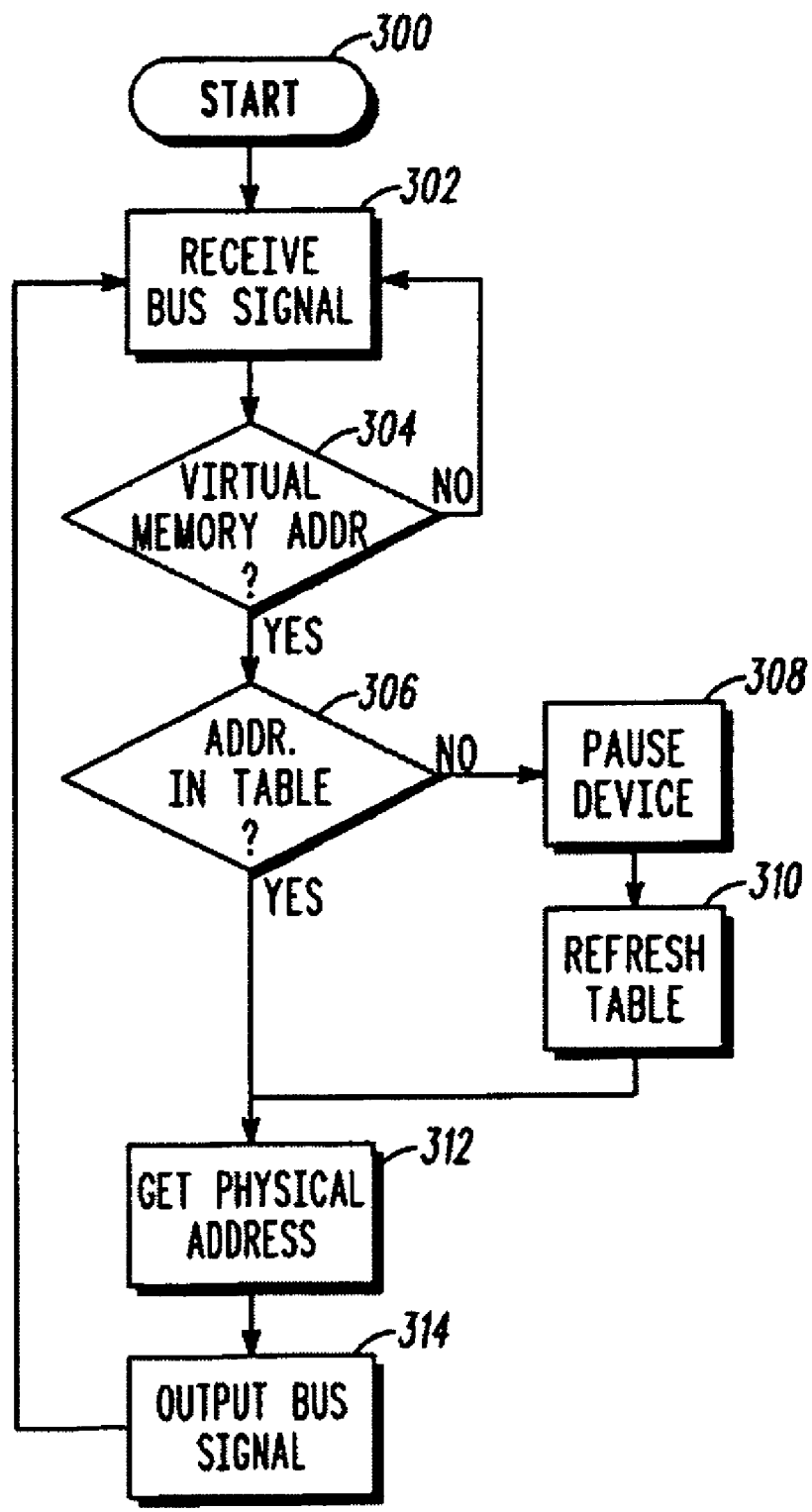
FIG. 3 is flowchart depicting a method of operation of an address translation filter in accordance with an embodiment of the present invention.

An exemplary embodiment of the method of operation of an address translation filter of the present invention is shown in the flowchart of FIG. 3. Following start block 300 in FIG. 3, the filter receives in input bus signal at block 302. In general, not all bus signals contain memory addresses, so at decision block 304 a check is made to determine if the bus signal contains a memory address. In one embodiment, the address is tagged as virtual address or a physical address. In a further embodiment, all addresses are assumed to be virtual addresses. If the bus signal does not specify a virtual address, flow returns to block 302 as depicted by the negative branch from decision block 304.

If the bus signal specifies a virtual address, as depicted by the positive branch from decision block 304, a check is performed at decision block 306 to determine if the address is contained within an address translation unit in the filter. The translation unit may take the form of a translation lookaside buffer (TLB) indexed by the virtual address (or the most significant portion of the address). If no entry exists on the table for the address, as depicted by the negative branch from decision block 306, the device making the request is paused or stalled at block 308. The lack of a matching address in the table is referred to as a TLB miss. TLB misses appear to the device as very slow memory, this apparent time being the time that it takes for some TLB reload mechanism to determine and load the correct mapping. Again, the bus protocols provide for variable memory speeds and the attached device must already handle this case. In power-sensitive environments, the clock signal may be routed through the address translation filter to the device, so that during the time when a TLB miss (missing translation) has occurred, the clock to the attached device can be suppressed. This may reduce the total power consumption in the device by eliminating any power use during such times when it is known to be stalled. If no entry exists in the table, the table is refreshed at block 310. Since the address translation filter itself appears on the AMBA bus, the processor core and system software can manage the TLB mappings, including when there is a "TLB miss", because the device requested an address that has not yet been loaded into the filter. In one embodiment of the invention, the filter sends a control signal, or interrupt, to the core processor and the processor responds by replacing an entry in the table by an entry corresponding to the unmatched address. The least used entry or the entry not used for the longest time may be replaced. To facilitate this, the filter may keep track of table accesses.

At block 312 the physical address corresponding to the virtual address is retrieved from the table. At block 314 the physical address is passed to the bus structure to facilitate the appropriate memory access. Flow then returns to block 302.

Figure 4:
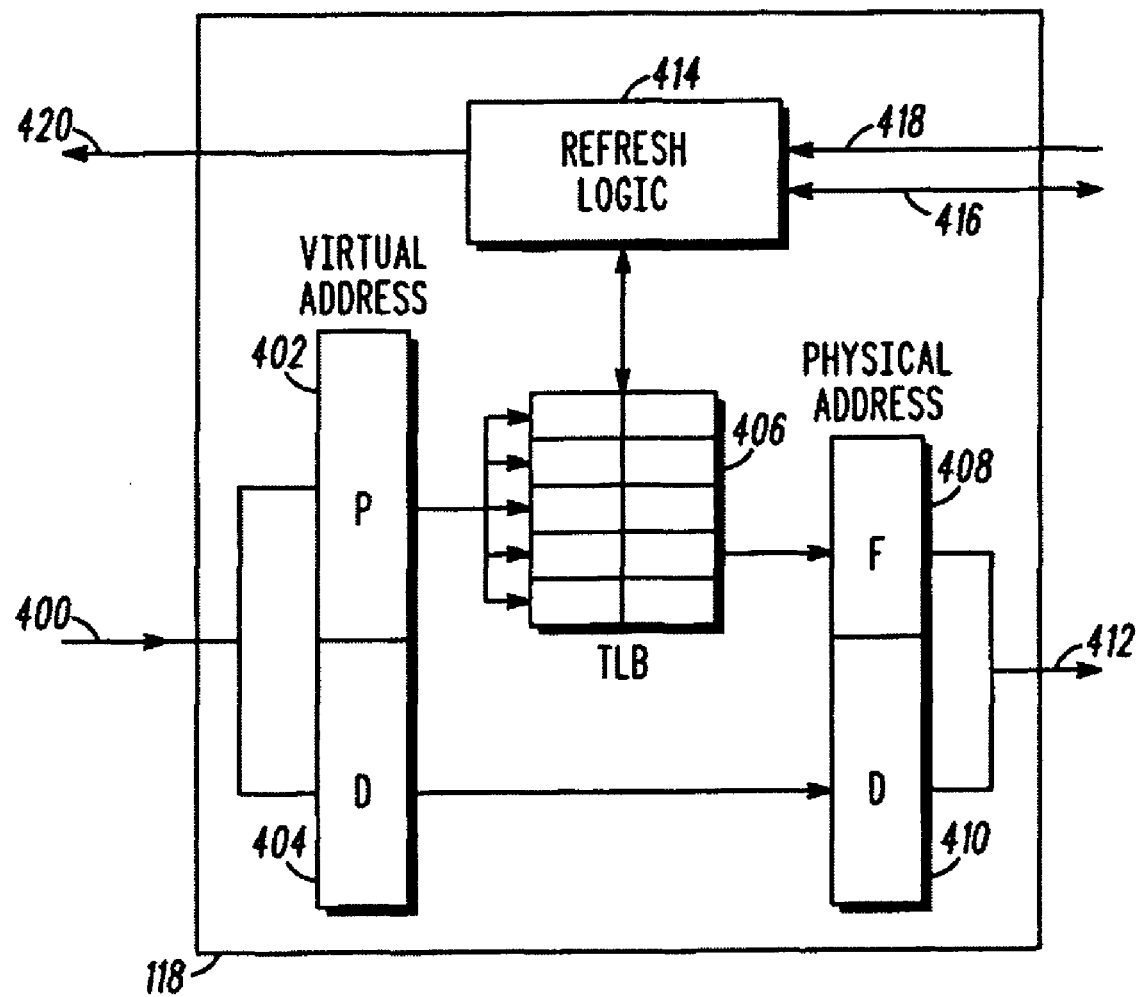
FIG. 4 is a diagrammatic representation of an address translation filter in accordance with an embodiment of the present invention.

FIG. 4 is a diagrammatic representation of an address translation filter 118 in accordance with an embodiment of the present invention. Referring to FIG. 4, the filter 118 has a first interface to receive a bus signal 400 from a device. The address portion of the signal typically comprises P bits specifying a page number 402 and D bits specifying an offset 404 from the start of the page. A TLB (translation lookaside buffer) or other address translation unit 406 provides a map linking the pages of virtual memory to frames of physical memory. The physical memory is typically smaller than the virtual memory. The memory frame is specified by F bits. The physical address comprises the frame address 408 and the offset 410. In practice, the bits specifying the offset may be simply passed through the address translation filter. The physical address is transmitted via a second interface to the bus structure at the output of the filter 412.

Referring still to FIG. 4, the address translation filter includes refresh logic 414. If a TLB miss occurs, the logic informs the core processor via link 416. This link may be a control line separate from the bus structure (such a hardware interrupt line) or the information may passed via a control vector on the bus structure itself. In one embodiment, the core processor determines how the TLB should be updated, using the bus structure to interrogate the address translation filter and to send new table entries to refresh the TLB. A system clock signal 418 may be received by the refresh logic and selectively passed to the attached device via link 420. If a TLB miss occurs, the device clock is paused until the TLB is refreshed. This mechanism may reduce the power consumption of the attached device.

The device of the present invention resolves several problems related to virtual and physical mapping. By providing virtual to physical mapping in the TLB, the programmer need not do such translation as part of setting up the attached device; the system software can use the translation tables for the host program for the information needed in the address translation filter. It also alleviates the requirement that such attached devices need contiguous memory regions for their work. Where such attached devices formerly required the allocation of these contiguous blocks at system initialization time, before memory becomes fragmented, the invention allows the allocation to be deferred until the device is actually used; this results in a net reduction in total memory required for such a system.

Those of ordinary skill in the art will recognize that the present invention could be implemented using a variety of hardware components, such as special purpose hardware, general purpose computers, microprocessor based computers, digital signal processors, microcontrollers, dedicated processors, custom circuits, ASICS and/or dedicated hard-wired logic.

The address translation filter of the invention may be configured to interface with a variety of bus structures, including the AMBA bus mentioned above and the AHB (Advanced High-performance Bus).

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An address translation filter for filtering a signal on a system bus that couples between a core processor and an external memory unit, the address translation filter comprising:
   a first interface operable under a first bus protocol to connect to the system bus and receive a virtual memory address from an external device connected to the bus;
   a second interface operable under a second bus protocol to connect to the system bus and transmit a physical memory address to the external memory unit;
   an input for receiving an input system clock signal;
   an output for transmitting an output system clock signal; and
   an address translation unit, comprising a translation lookaside buffer and a refresh logic unit operable to refresh the translation lookaside buffer if the virtual memory address is not matched by an entry in the translation lookaside buffer, the address translation unit being external to the core processor and coupled between the first and second interfaces, operable to determine the physical memory address from the virtual memory address,
wherein the first bus protocol is the same as the second bus protocol, and wherein the output clock signal is paused while the translation lookaside buffer is being refreshed.

2. An address translation filter in accordance with claim 1, wherein the address translation unit includes a lookup table indexed by virtual addresses.

3. An address translation filter in accordance with claim 2, wherein the lookup table is indexed by the most significant portion of a virtual address.

4. An address translation filter in accordance with claim 1, further comprising:
   an output control link responsive to the refresh logic unit and operable to signal the core processor when the translation lookaside buffer is to be refreshed.

5. An address translation filter in accordance with claim 1, wherein the virtual and physical memory addresses have the same width.

6. A digital processing system, comprising:
   a core processor;
   a processing device external to the core processor;
   an address translation filter comprising a translation lookaside buffer having an input for receiving an input system clock signal and an output for transmitting an output system clock signal; and
   a system bus operable to link the core processor and the address translation filter to each other under a bus protocol and to link the processing device to the address translation filter under the same bus protocol, wherein the address translation filter is operable to translate a virtual memory address received via the system bus from the processing device into a physical memory address in an external memory unit and to transmit the physical memory address to the external memory unit via the system bus, and wherein the output clock signal is paused while the translation lookaside buffer is being refreshed.

7. A digital processing system in accordance with claim 6, wherein the address translation filter further comprises:
   a refresh logic unit operable to refresh the translation lookaside buffer when the virtual memory address is not matched by an entry in the translation lookaside buffer.

8. A digital processing system in accordance with claim 7, wherein the address translation filter further comprises:
   an output control link responsive to the refresh logic unit and operable to send a refresh signal the core processor when the translation lookaside buffer is to be refreshed.

9. A digital processing system in accordance with claim 7, wherein the core processor is operable to refresh the translation lookaside buffer when a refresh signal is received from the address translation filter.

10. A digital processing system in accordance with claim 9, wherein the translation lookaside buffer is refreshed via the system bus.

11. A digital processing system in accordance with claim 6, wherein the bus is one of an AMBA bus and an AHB bus.

12. A digital processing system comprising:
    a core processor;
    an external memory unit;
    an external processing device;
    an address translation filter comprising a table of physical memory addresses indexed by virtual address, an input for receiving, an input system clock signal and an output for transmitting an output system clock signal; and
    a system bus linking the core processor, the external memory and the address translation filter to each other and linking the external processing device to the address translation filter,
wherein the address translation unit is operable to translate a virtual memory address received via the system bus from the external processing device into a physical memory address transmitted via the system bus to the external memory unit, wherein the bus is one of an AMBA bus and an AHB bus and wherein the output clock signal is paused while the table of physical memory addresses is being refreshed.

13. A digital processing system in accordance with claim 12, wherein the table of physical memory addresses comprises a translation lookaside buffer and wherein the address translation filter further comprises:
    a refresh logic unit operable to refresh the translation lookaside buffer if the virtual memory address is not matched by an entry in the translation lookaside buffer.

14. A digital processing system in accordance with claim 13, wherein the address translation filter further comprises:
    an output control link responsive to the refresh logic unit and operable to send a refresh signal the core processor when the translation lookaside buffer is to be refreshed.

15. A digital processing system in accordance with claim 14, wherein the core processor is operable to refresh the translation lookaside buffer when a refresh signal is received from the address translation filter.

16. A digital processing system in accordance with claim 15, wherein the translation lookaside buffer is refreshed via the system bus.

17. A method of memory address translation in a bus coupled between a core processor and an external memory unit, the method comprising:
    receiving a first bus signal from a processing device via the bus in accordance with a first bus protocol;
    translating a virtual memory address specified by the first bus signal to a physical memory address in an address translation filter by selecting a physical memory address from a table of physical memory addresses, the table of physical memory addresses being indexed by virtual addresses;
    refreshing the table of physical memory addresses if the table has no entry for the virtual address; and transmitting a second bus signal via the bus to the external memory unit in accordance with a second bus protocol, the second bus signal specifying the physical memory address, providing a system clock signal to the processing device; and pausing the system clock signal while the table of physical memory addresses is being refreshed;

wherein the first bus protocol is the same as the second bus protocol.

18. A method in accordance with claim 17, wherein the refreshing comprises receiving data via the bus from the core processor coupled to the bus.

19. A method in accordance with claim 17, wherein the refreshing comprises:

signaling the core processor that the table of physical memory addresses needs to refreshed;

passing the virtual memory address to the core processor; and receiving a new physical memory address from the core processor.

20. A method in accordance with claim 17, wherein the second bus signal is transmitted to the external memory unit.

21. A method in accordance with claim 17, wherein the first bus signal is received from the processing device external to the core processor.

22. A method of memory address translation in a bus coupled between a core processor and an external memory unit, the method comprising:

receiving a first bus signal from a processing device via the bus in accordance with a first bus protocol;

translating a virtual memory address specified by the first bus signal to a physical memory address in an address translation filter by selecting a physical memory address from a table of physical memory addresses, the table of physical memory addresses being indexed by virtual addresses;

refreshing the table of physical memory addresses if the table has no entry for the virtual address;

transmitting a second bus signal via the bus to the external memory unit in accordance with a second bus protocol, the second bus signal specifying the physical memory address, transferring code from a core processor to the processing device; wherein the first bus protocol is the same as the second bus protocol; and transferring an initial memory map from the core processor to the address translation filter.

23. A digital processing circuit, comprising:

a core processor;

a processing device external to the core processor;

a system bus coupled to the core processor and operable to link the core processor to an external memory unit under a system bus protocol;

an address translation filter comprising a table of physical addresses indexed by virtual addresses, the address translation filter being operable to couple the processing device to the system bus under the same system bus protocol, wherein the address translation filter is operable to translate a virtual memory address received via the system bus from the processing device into a physical memory address, in the external memory, transmitted via the system bus to the external memory unit and is further operable to pause a system clock supplied to the processing device if the table of physical memory addresses has no entry for a virtual address received from the processing device.

24. A digital processing circuit in accordance with claim 23, wherein the system bus comprises an Advanced High-performance Bus.

25. A digital processing system in accordance with claim 23, wherein the system bus has an Advanced Micro-controller Bus Architecture.

* * * * *